US012649849B2

(12) United States Patent
Wan et al.

(10) Patent No.: US 12,649,849 B2
(45) Date of Patent: Jun. 9, 2026

(54) HIGH STIFFNESS, HIGH IMPACT, CLARIFIED POLYPROPYLENE COMPOSITIONS

(71) Applicant: Winpak Ltd., Winnipeg (CA)

(72) Inventors: Chen Wan, Kingwood, TX (US); Ming-Lun Wu, Richmond, TX (US)

(73) Assignee: Winpak Ltd., Winnipeg (CA)

( * ) Notice: Subject to any disclaimer, the term of this patent is extended or adjusted under 35 U.S.C. 154(b) by 625 days.

(21) Appl. No.: 18/067,285

(22) Filed: Dec. 16, 2022

(65) Prior Publication Data

US 2023/0193006 A1 Jun. 22, 2023

Related U.S. Application Data

(60) Provisional application No. 63/265,602, filed on Dec. 17, 2021.

(51) Int. Cl.
*C08L 23/12* (2006.01)

(52) U.S. Cl.
CPC ......... *C08L 23/12* (2013.01); *C08L 2205/025* (2013.01)

(58) Field of Classification Search
None
See application file for complete search history.

(56) References Cited

U.S. PATENT DOCUMENTS

| | | | | |
|---|---|---|---|---|
| 6,037,417 | A * | 3/2000 | Nguyen | C08L 23/10 525/240 |
| 6,432,496 | B1 | 8/2002 | Klosiewicz | |
| 7,314,901 | B2 | 1/2008 | Kuo et al. | |
| 8,722,805 | B2 | 5/2014 | Filipe et al. | |
| 12,077,661 | B2 * | 9/2024 | Wan | C08L 23/12 |
| 2003/0054161 | A1 * | 3/2003 | Forte | C08K 5/0083 524/81 |
| 2004/0132884 | A1 * | 7/2004 | Dotson | C07C 51/412 524/394 |
| 2004/0170854 | A1 | 9/2004 | Kuo et al. | |
| 2012/0060997 | A1 | 3/2012 | Mitchell et al. | |
| 2015/0336359 | A1 | 11/2015 | Dou et al. | |
| 2016/0060407 | A1 | 3/2016 | Hoya et al. | |
| 2017/0015821 | A1 | 1/2017 | Dou et al. | |
| 2017/0369688 | A1 | 12/2017 | Donahue et al. | |
| 2018/0305534 | A1 | 10/2018 | Kalfus et al. | |
| 2018/0362746 | A1 | 12/2018 | Wang et al. | |
| 2020/0139685 | A1 | 5/2020 | Strunk-westermann et al. | |
| 2020/0215803 | A1 | 7/2020 | Dou et al. | |
| 2022/0135714 | A1 * | 5/2022 | Gahleitner | C08L 23/12 526/351 |

FOREIGN PATENT DOCUMENTS

| | | | | |
|---|---|---|---|---|
| JP | 2010215901 | A * | 9/2010 | C08J 9/00 |
| JP | 2021113314 | A * | 8/2021 | C08J 5/00 |
| KR | 2017-0035711 | A | 3/2017 | |
| WO | 2014056559 | A1 | 4/2014 | |
| WO | 2016053468 | A1 | 4/2016 | |
| WO | 2020053164 | A1 | 3/2020 | |
| WO | 2022228812 | A1 | 11/2022 | |

OTHER PUBLICATIONS

Machine translation of JP-2010215901-A, translation generated Oct. 2025, 13 pages. (Year: 2025).*

Machine translation of JP-2021113314-A, translation generated Oct. 2025, 22 pages. (Year: 2025).*

Haze of Plastic Materials, retrieved from the web on Oct. 15, 2025, 7 pages. (Year: 2025).*

Elmoumni, Aadil, et al., Isotactic Poly(propylene) Crystallization: Role of Small Fractions of High or Low Molecular Weight Polymer, Macromol. Chem. Phys., 2005, 206, pp. 125-134.

Gajzlerova, L., et al., Joint effects of long-chain branching and specific nucleation on morphology and thermal properties of polypropylene blends, eXPRESS Polymer Letters vol. 14, No. 10 (2020) pp. 952-961.

Chen, Jean-Hong, et al., Isothermal crystallization of isotactic polypropylene blended with low molecular weight atactic polypropylene. Part I. Thermal properties and morphology development, Polymer 46 (2005), pp. 5680-5688.

International Search Report and the Written Opinion of the International Searching Authority, International Patent Application No. PCT/IB2022/062410, pp. 1-8, dated Apr. 4, 2023.

International Preliminary Report on Patentability, International Application No. PCT/IB2022/062410, dated Jun. 13, 2024, pp. 1-5.

International Search Report and the Written Opinion of the International Searching Authority, International Patent Application No. PCT/IB2022/062408, pp. 1-10, dated Apr. 11, 2023.

International Preliminary Report on Patentability, International Application No. PCT/IB2022/062408, dated Jun. 13, 2024, pp. 1-6.

* cited by examiner

*Primary Examiner* — Robert S Loewe
(74) *Attorney, Agent, or Firm* — Bond, Schoeneck & King, PLLC

(57) ABSTRACT

Described herein are high stiffness, high impact strength and clarified polypropylene-containing compositions. The disclosed compositions comprise a polypropylene, a nucleating agent, and optionally one or more additives. In certain aspects, the polypropylene includes a first polypropylene and a second polypropylene that is different from the first. The disclosed compositions exhibit high stiffness, high impact strength, improved clarity, and improved thermoformability. Also described herein are articles comprising the disclosed compositions and methods of manufacturing such articles.

16 Claims, 6 Drawing Sheets

200

210    FORM A BATCH MIXTURE COMPRISING AN FCM COMPOSITION

220    EXTRUDE THE BATCH MIXTURE INTO A PROCESSABLE FORM

230    FORM FOOD PACKAGING ARTICLE

240    SEAL THE FOOD PACKAGING ARTICLE

HIGH STIFFNESS, HIGH IMPACT, CLARIFIED POLYPROPYLENE COMPOSITIONS

CROSS-REFERENCE TO RELATED APPLICATIONS

This application claims priority to and the benefit of U.S. Provisional Patent Application Ser. No. 63/265,602, filed on Dec. 17, 2021, and entitled "HIGH STIFFNESS, HIGH IMPACT POLYPROPYLENE COMPOSITIONS", which is hereby incorporated by reference in its entirety.

FIELD OF THE DISCLOSURE

The present disclosure is directed generally to high stiffness, high impact and clarified polypropylene compositions. More specifically, the present disclosure relates to high stiffness, high impact polypropylene compositions having improved clarity and thermoformability.

BACKGROUND

The global food packaging industry is governed at various national and international levels by a number of different organizations and regulations. Food contact materials (e.g., packaging materials that contact food) not only need to comply with the rules and regulations of these various organizations, but also need to provide a positive user experience. For example, it is known that food packaging can affect a consumer's overall experience and perception of the product being consumed. Further, what mechanical, chemical properties, and/or optical properties are considered desirable may change depending on the application of the food contact material or product packaging in general. In the rigid food packaging arena, polypropylene (PP) has been widely used as a material of choice, while other polymers such as polystyrene (PS) and polyethylene terephthalate (PET) are preferred in Form-Fill-Seal (FFS) food packaging applications because of their high stiffness, high clarity, high impact strength, and low shrinkage when compared with a polymer such as polypropylene. These and other drawbacks limit the potential applications for polypropylene where such properties are important factors.

SUMMARY OF THE DISCLOSURE

The present disclosure provides polypropylene compositions having improved properties and finds particular application in the food packaging and related industries.

According to an embodiment of the present disclosure, a food contact material (FCM) composition is provided. The composition comprises: about 60 wt % to about 99.9 wt % of a polypropylene; and at least about 0.02 wt % of a nucleating agent.

In an aspect, the polypropylene may comprise a polypropylene that is a homopolymer.

In an aspect, the polypropylene may comprise a first polypropylene and a second polypropylene, provided the first polypropylene is different from the second polypropylene.

In an aspect, the composition may comprise from about 60 wt % to about 99 wt % of the first polypropylene and from about 1 wt % to about 40 wt % of the second polypropylene.

In an aspect, the first polypropylene can have a melt flow rate of at least about 35 grams/10 minutes, according to ASTM D1238, and the second polypropylene can have a melt flow rate of less than about 3 grams/10 minutes, according to ASTM D1238.

In an aspect, the composition may comprise from about 0.02 wt % to about 5 wt % of the nucleating agent.

In an aspect, the composition can have a machine direction (MD) flexural modulus of at least about 2100 MPa, measured according to ASTM D790 at 1% secant.

In an aspect, the composition can have a transverse direction (TD) flexural modulus of at least about 2100 MPa, measured according to ASTM D790 at 1% secant.

In an aspect, the composition can have a multiaxial impact peak force of at least about 2000 Newtons, measured according to ISO 6603-2 at 2.2 meters/second.

In an aspect, the composition can have a multiaxial impact total energy of at least about 12 Joules, measured according to ISO 6603-2 at 2.2 meters/second.

In an aspect, the composition can have a haze value of less than about 80% when extruded as a sheet, measured according to ASTM D1003.

In an aspect, the food contact material composition can have a haze value of less than 20% when thermoformed into a cup, measured according to ASTM D1003.

In an aspect, the composition can have a rim diameter shrinkage of less than about 3.00% when thermoformed into a cup.

In an aspect, the composition may not include an inorganic filler.

In an aspect, the composition can have a flexural modulus greater than about 2200 MPa when measured according to ASTM D790 at 1% secant, a multiaxial impact peak force greater than about 2100 Newtons when measured according to ISO 6603-2 at 2.2 meters/second, a multiaxial impact total energy greater than about 15 Joules when measured according to ISO 6603-2 at 2.2 meters/second, a rim diameter shrinkage less than about 2.05%, a haze less than about 75% when extruded as a sheet and measured according to measured according to ASTM D1003, and a haze of less than about 11.2% when thermoformed into a cup and measured according to measured according to ASTM D1003.

In an aspect, the composition can consist essentially of about 60 wt % to about 99.9 wt % of a polypropylene and a remainder being a nucleating agent, wherein the polypropylene comprises from about 60 wt % to about 99 wt % of a first polypropylene and a remainder being a second polypropylene, provided the first polypropylene is different from the second polypropylene.

According to another embodiment of the present disclosure, a food packaging article having a surface suitable for contacting a food product is provided. The food packaging article may be formed from a food contact material composition.

In an aspect, the food packaging article can be transparent, or can have a thin wall having a cross-sectional thickness of 3 mm or less.

According to yet another embodiment of the present disclosure, a method of manufacturing a food packaging article suitable for contacting a food product is provided. The method comprises: forming a batch mixture comprising a food contact material composition; extruding the batch mixture into a processable form; and forming a fillable food packaging article from the processable form of the batch mixture; wherein the food contact material composition comprises from about 60 wt % to about 99.9 wt % of a polypropylene and from about 0.02 wt % to about 3 wt % of a nucleating agent.

In an aspect, extruding the batch mixture into a processable form may comprise extruding the batch mixture into a sheet, and forming the fillable food packaging article may comprise thermoforming the extruded sheet into a desired shape.

In an aspect, the food contact material composition may comprise from about 60 wt % to about 99 wt % of a first polypropylene, from about 1 wt % to about 40 wt % of a second polypropylene that is different from the first polypropylene, and from about 0.02 wt % to about 3 wt % of the nucleating agent.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION OF EMBODIMENTS

Figure 1B:
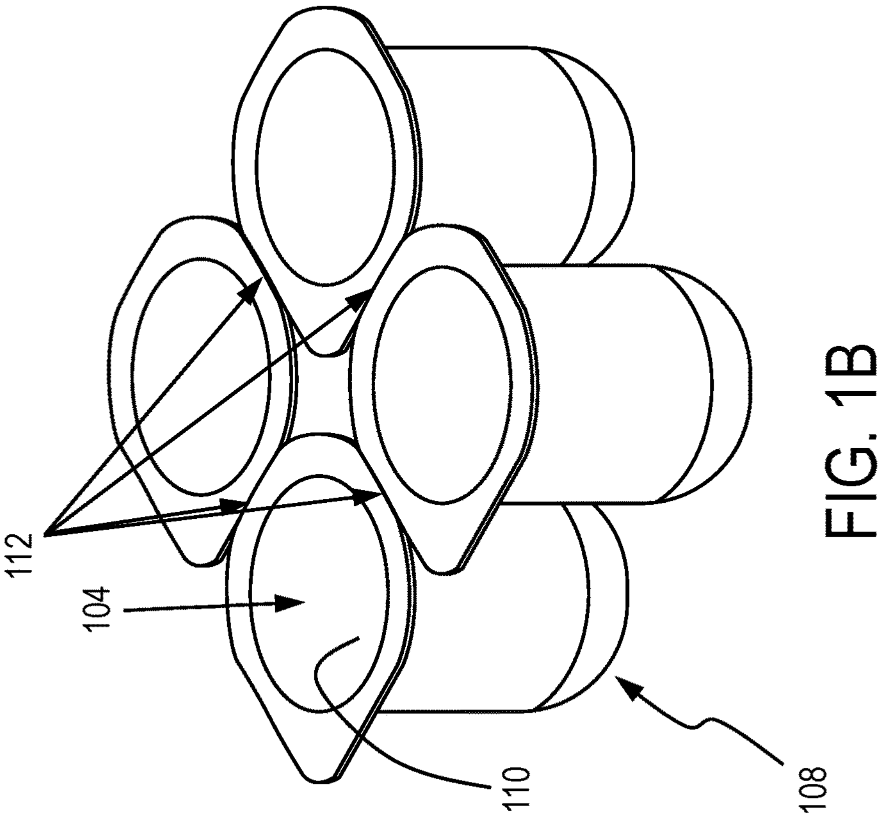
FIG. 1B is a perspective view of multiple food packaging articles formed from a food contact material composition according to aspects of the present disclosure.

As mentioned above, the intended application of a food contact material or product packaging in general can change what mechanical and/or chemical properties are desirable. While polypropylene has been widely used in rigid food packaging applications, other food contact materials such as polystyrene (PS) and polyethylene terephthalate (PET) are preferred in Form-Fill-Seal (FFS) food packaging applications. This is because, when compared with polystyrene for example, polypropylene has lower stiffness, worse clarity, higher shrinkage, and lower melt strength. In general, some of these shortcomings may be addressed by changing the parameters of the polymer used. However, changing one parameter often changes other properties. For example, increasing the molecular weight of a polypropylene can increase stiffness but will result in high viscosity and reduced processability. In another example, adding an inorganic filler into a polypropylene may increase stiffness but reduce impact strength and clarity.

As described herein, it has been advantageously found that certain polypropylene compositions exhibit a combination of mechanical, chemical, and/or optical properties that enable use of such polypropylene compositions in food packaging applications other than rigid food packaging, such as FFS food packaging. In particular, the present disclosure is directed to compositions containing polypropylene having one or more improved mechanical and optical properties when compared with other compositions containing polypropylene and/or other polymers. The compositions described herein find particular application in the food packaging industry and FFS food packaging where high stiffness, minimal shrinkage, thin walls, and good clarity, and snappability are important factors. The disclosed compositions also maintain and/or provide improved processability, such as improved thermoformability.

Accordingly, provided herein are compositions comprising at least one polypropylene, a nucleating agent, and optionally one or more other additives. In embodiments, the compositions may be a food contact material (FCM) composition that is used to form a food contact material and/or a food packaging article.

In embodiments, the compositions described herein include at least one polypropylene, i.e., at least one polymer formed by the polymerization of at least propylene ($CH_2{=}CHCH_3$) monomers, thereby having the repeating unit according to Formula (1):

Formula (1)

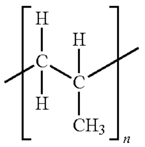

wherein n is an integer greater than zero.

In embodiments, the polypropylene can have a melt flow rate (MFR) of at least about 35 g/10 min. when measured according to ASTM D1238, including at least about 35 g/10 min., at least about 40 g/10 min., at least about 45 g/10 min., at least about 50 g/10 min., at least about 55 g/10 min., at least about 60 g/10 min., at least about 65 g/10 min., at least about 70 g/10 min., at least about 75 g/10 min., at least about 80 g/10 min., at least about 85 g/10 min., at least about 90 g/10 min., and ranges having any combination of endpoints thereof.

In embodiments, the polypropylene can have a melt flow rate (MFR) of less than about 10 g/10 min. when measured according to ASTM D1238, including less than about 9 g/10 min., less than about 8 g/10 min., less than about 7 g/10 min., less than about 6 g/10 min., less than about 5 g/10 min., less than about 4 g/10 min., less than about 3.0 g/10 min., less than about 2.5 g/10 min., less than about 2.0 g/10 min., less than about 1.5 g/10 min., and amounts/ranges based on the endpoints thereof.

In embodiments, the polypropylene can be a homopolymer, a random copolymer, or a block copolymer. For example, a polypropylene copolymer can have units X and O units arranged in regular or repeating sequences (e.g., -X-O-X-O-X-O-, -X-X-X-O-O-O-, etc.), or arranged randomly (e.g., -X-X-O-X-O-X-O-O-X-O-, etc.). The polypropylenes can include from about 0.1 mol % to about 99.9 mol % of each selected monomer unit, including from about 1 mol % to about 99 mol %, from about 5 mol % to about 95 mol %, from about 10 mol % to about 90 mol %, from about 15 mol % to about 85 mol %, from about 20 mol % to about 80 mol %, from about 25 mol % to about 75 mol %, from about 30 mol % to about 70 mol %, from about 35 mol % to about 65 mol %, from about 40 mol % to about 60 mol %, from about 45 mol % to about 55 mol %, and about 50 mol %. The mole percent of each of the monomers of a polypropylene copolymer can be determined using peak area values determined by $^{13}C$ nuclear magnetic resonance (NMR) spectroscopy, for example. In specific aspects, the polypropylene can be a copolymer comprising repeating units derived from propylene ($CH_2{=}CHCH_3$) and ethylene ($CH_2{=}CH_2$).

The polypropylene can further be an isotactic polypropylene, a syndiotactic polypropylene, or an atactic polypropylene. In still further aspects, the polypropylene can be a nucleated polypropylene or an un-nucleated polypropylene.

In embodiments, the compositions disclosed herein can include at least about 60 wt % of the at least one polypropylene based on the total weight of the composition. In particular embodiments, the compositions can include from about 60 wt % to about 99.9 wt % of the polypropylene based on the total weight of the composition, including from about 60 wt % to about 65 wt %, from about 65 wt % to about 70 wt %, from about 70 wt % to about 75 wt %, from about 75 wt % to about 80 wt %, from about 80 wt % to about 81 wt %, from about 81 wt % to about 82 wt %, from about 82 wt % to about 83 wt %, from about 83 wt % to about 84 wt %, from about 84 wt % to about 85 wt %, from about 85 wt % to about 86 wt %, from about 86 wt % to about 87 wt %, from about 87 wt % to about 88 wt %, from about 88 wt % to about 89 wt %, from about 89 wt % to about 90 wt %, from about 90 wt % to about 91 wt %, from about 91 wt % to about 92 wt %, from about 92 wt % to about 93 wt %, from about 93 wt % to about 94 wt %, from about 94 wt % to about 95 wt %, from about 95 wt % to about 95.5 wt %, from about 95.5 wt % to about 96 wt %, from about 96 wt % to about 96.5 wt %, from about 96.5 wt % to about 97 wt %, from about 97 wt % to about 97.5 wt %, from about 97.5 wt % to about 98 wt %, from about 98 wt % to about 98.5 wt %, from about 98.5 wt % to about 99 wt %, from about 99 wt % to about 99.5 wt %, from about 99.5 wt % to about 99.9 wt %, and ranges having any combination of endpoints thereof.

In particular embodiments, the compositions comprise at least one polypropylene, as described above, wherein the at least one polypropylene comprises a first polypropylene and a second polypropylene. Put another way, the compositions of the present disclosure can comprise at least a first polypropylene and at least a second polypropylene that is different from the first polypropylene.

In such aspects, the composition can comprise from about 60 wt % to about 99 wt % of at least the first polypropylene based on the total weight of the Composition, including about 60 wt %, about 61 wt %, about 62 wt %, about 63 wt %, about 64 wt %, about 65 wt %, about 66 wt %, about 67 wt %, about 68 wt %, about 69 wt %, about 70 wt %, about 71 wt %, about 72 wt %, about 73 wt %, about 74 wt %, about 75 wt %, about 76 wt %, about 77 wt %, about 78 wt %, about 79 wt %, about 80 wt %, about 81 wt %, about 82 wt %, about 83 wt %, about 84 wt %, about 85 wt %, about 86 wt %, about 87 wt %, about 88 wt %, about 89 wt %, about 90 wt %, about 91 wt %, about 92 wt %, about 93 wt %, about 94 wt %, about 95 wt %, about 96 wt %, about 97 wt %, about 98 wt %, about 99 wt %, and ranges with any combination of endpoints thereof.

In embodiments, the composition can further comprise from about 1 wt % to about 40 wt % of at least the second polypropylene based on the total weight of the composition, including about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, about 20 wt %, about 21 wt %, about 22 wt %, about 23 wt %, about 24 wt %, about 25 wt %, about 26 wt %, about 27 wt %, about 28 wt %, about 29 wt %, about 30 wt %, about 31 wt %, about 32 wt %, about 33 wt %, about 34 wt %, about 35 wt %, about 36 wt %, about 37 wt %, about 38 wt %, about 39 wt %, about 40 wt %, and ranges with any combination of endpoints thereof.

In particular embodiments, the at least one polypropylene includes a first polypropylene is different from a second polypropylene. For example, the composition can comprise a first polypropylene having a melt flow rate of at least about 30 g/10 min., and can further comprise a second polypropylene having a melt flow rate of less than about 10 g/10 min. In some embodiments, the first polypropylene can have a melt flow rate of at least about 35 g/10 min., at least about 40 g/10 min., at least about 45 g/10 min., at least about 50 g/10 min., at least about 55 g/10 min., at least about 60 g/10 min., at least about 65 g/10 min., at least about 70 g/10 min., at least about 75 g/10 min., at least about 80 g/10 min., at least about 85 g/10 min., at least about 90 g/10 min., and/or ranges having any combination of endpoints thereof. In further embodiments, the second polypropylene can have a melt flow rate of less than about 9 g/10 min., less than about 8 g/10 min., less than about 7 g/10 min., less than about 6 g/10 min., less than about 5 g/10 min., less than about 4 g/10 min., less than about 3.0 g/10 min., less than about 2.5 g/10 min., less than about 2.0 g/10 min., less than about 1.5 g/10 min., and/or ranges having any combination of endpoints thereof.

As described herein, the compositions of the present disclosure further comprise at least one nucleating agent. It should be appreciated that polymer materials can undergo crystallization at various stages during a particular formation and/or manufacturing process. Crystallization of a polymer material involves the alignment, folding, ordering, and aggregation of molecular chains of the polymer, and is a process that significantly impacts the properties of the polymer material. The locations at which these molecular chains begin forming a polymer crystal is referred to as a nucleation site, and the term “nucleating agent” describes compounds and/or compositions that may be added to polymers to provide additional nucleation sites (i.e., facilitate nucleation at additional locations) for polymer crystal growth during the cooling stage(s) of such molding and/or fabrication processes.

In embodiments, the nucleating agent can include sodium benzoate, organophosphates, kaolin, sorbitol derivatives, pimelic acid salts, benzene-trisamides, HPN-600ei or HPN-68L, polymeric nucleating agent such as PEs, and the like, including combinations thereof.

In embodiments, the composition can comprise at least about 0.02 wt % of the nucleating agent based on the total weight of the composition. In particular embodiments, the composition can comprise from about 0.02 wt % to about 3.0 wt % of the nucleating agent, including from about 0.02 wt % to about 0.03 wt %, from about 0.03 wt % to about 0.04 wt %, from about 0.04 wt % to about 0.05 wt %, from about 0.05 wt % to about 0.06 wt %, from about 0.06 wt % to about 0.07 wt %, from about 0.07 wt % to about 0.08 wt %, from about 0.08 wt % to about 0.09 wt %, from about 0.09 wt % to about 0.1 wt %, from about 0.1 wt % to about 0.2 wt %, from about 0.2 wt % to about 0.3 wt %, from about 0.3 wt % to about 0.4 wt %, from about 0.4 wt % to about 0.5 wt %, from about 0.5 wt % to about 0.6 wt %, from about 0.6 wt % to about 0.7 wt %, from about 0.7 wt % to about 0.8 wt %, from about 0.8 wt % to about 0.9 wt %, from about 0.9 wt % to about 1.0 wt %, from about 1.0 wt % to about 1.1 wt %, from about 1.1 wt % to about 1.2 wt %, from about 1.2 wt % to about 1.3 wt %, from about 1.3 wt % to about 1.4 wt %, from about 1.4 wt % to about 1.5 wt %, from about 1.5 wt % to about 1.6 wt %, from about 1.6 wt % to about 1.7 wt %, from about 1.7 wt % to about 1.8 wt %, from about 1.8 wt % to about 1.9 wt %, from about 1.9 wt % to about 2.0 wt %, from about 2.0 wt % to about 2.1 wt %, from about 2.1 wt % to about 2.2 wt %, from about 2.2 wt % to about 2.3 wt %, from about 2.3 wt % to about 2.4 wt %, from about 2.4 wt % to about 2.5 wt %, from about 2.5 wt % to about 2.6 wt %, from about 2.6 wt % to about 2.7 wt %, from about 2.7 wt % to about 2.8 wt %, from about 2.8 wt % to about 2.9 wt %, from about 2.9 wt % to about 3.0 wt %, and ranges having any combination of endpoints thereof.

In some embodiments, the compositions of the present disclosure can further include one or more additives depending on the application of the composition. For example, the one or more additives can include one or more stabilizers, antioxidants, acid scavengers, flame retardants, impact modifiers, fillers, clarifiers, UV stabilizers, release agents, plasticizers, lubricants, anti-statics, anti-microbials, heat stabilizers, and/or colorants. For example, the composition can comprise from about 0 wt % to about 40 wt % of the one or more additives based on the total weight of the composition, including from about 0 wt % to about 20 wt %, from about 0 wt % to about 10 wt %, from about 0 wt % to about 5 wt %, and any combination of endpoints thereof.

In some embodiments, the compositions disclosed herein exclude one or more of these additives. That is, the compositions of the present disclosure can be substantially free from one or more stabilizers, antioxidants, acid scavengers, flame retardants, impact modifiers, fillers (e.g., inorganic fillers), clarifiers, UV stabilizers, release agents, plasticizers, lubricants, anti-statics, anti-microbials, heat stabilizers, and/or colorants. As used herein, the term "substantially free from" means the composition contains about 0 wt % of the one or more additives based on the total weight of the composition. As such, the one or more additives may be present in no more than trace amounts and do not affect the properties of the composition.

In specific aspects, the compositions can include from about 60 wt % to about 99.9 wt % of the polypropylene, at least about 0.05 wt % of the nucleating agent, and the remainder being one or more additives. Where the compositions do not include any additional additives, the compositions can include at least about 0.05 wt % of the nucleating agent, based on the total weight of the composition, with the remainder being the polypropylene.

As described herein, the compositions advantageously achieve a synergistic combination of properties, including improved mechanical properties such as high stiffness and improved impact strength together with improved clarity, lower haze, better processability, and reduced shrinkage that enable use of such polypropylene-containing compositions in a wider array of food packaging. In particular, the disclosed compositions achieve improved properties in one or more of improved stiffness, impact strength, clarity, haze, processability, and shrinkage without the incurring drawbacks to other properties, such as reduced processability, clarity, and/or sustainability.

In embodiments, the compositions described herein can have a machine direction (MD) flexural modulus of at least about 2100 MPa when measured according to ASTM D790 (1% secant, about 23° C.), including about 2100 MPa, about 2110 MPa, about 2120 MPa, about 2130 MPa, about 2140 MPa, about 2150 MPa, about 2160 MPa, about 2170 MPa, about 2180 MPa, about 2190 MPa, about 2200 MPa, about 2210 MPa, about 2220 MPa, about 2230 MPa, about 2240 MPa, about 2250 MPa, about 2260 MPa, about 2270 MPa, about 2280 MPa, about 2290 MPa, about 2300 MPa, about 2310 MPa, about 2320 MPa, about 2330 MPa, about 2340 MPa, about 2350 MPa, about 2360 MPa, about 2370 MPa, about 2380 MPa, about 2390 MPa, about 2400 MPa, about 2410 MPa, about 2420 MPa, about 2430 MPa, about 2440 MPa, about 2450 MPa, about 2460 MPa, about 2470 MPa, about 2480 MPa, about 2490 MPa, about 2500 MPa, and ranges having any combination of endpoints thereof.

In embodiments, the compositions described herein can have a transverse direction (TD) flexural modulus of at least about 2100 MPa when measured according to ASTM D790 (1% secant, about 23° C.), including about 2100 MPa, about 2110 MPa, about 2120 MPa, about 2130 MPa, about 2140 MPa, about 2150 MPa, about 2160 MPa, about 2170 MPa, about 2180 MPa, about 2190 MPa, about 2200 MPa, about 2210 MPa, about 2220 MPa, about 2230 MPa, about 2240 MPa, about 2250 MPa, about 2260 MPa, about 2270 MPa, about 2280 MPa, about 2290 MPa, about 2300 MPa, about 2310 MPa, about 2320 MPa, about 2330 MPa, about 2340 MPa, about 2350 MPa, about 2360 MPa, about 2370 MPa, about 2380 MPa, about 2390 MPa, about 2400 MPa, about 2410 MPa, about 2420 MPa, about 2430 MPa, about 2440 MPa, about 2450 MPa, about 2460 MPa, about 2470 MPa, about 2480 MPa, about 2490 MPa, about 2500 MPa, and ranges having any combination of endpoints thereof.

In embodiments, the compositions described herein can have a multiaxial impact peak force of at least 2000 Newtons when measured according to ISO-6603-2 (at 2.2 meters/second), including about 2000 Newtons, about 2010 Newtons, about 2020 Newtons, about 2030 Newtons, about 2040 Newtons, about 2050 Newtons, about 2060 Newtons, about 2070 Newtons, about 2080 Newtons, about 2090 Newtons, about 2100 Newtons, about 2110 Newtons, about 2120 Newtons, about 2130 Newtons, about 2140 Newtons, about 2150 Newtons, about 2160 Newtons, about 2170 Newtons, about 2180 Newtons, about 2190 Newtons, about 2200 Newtons, about 2210 Newtons, about 2220 Newtons, about 2230 Newtons, about 2240 Newtons, about 2250 Newtons, about 2260 Newtons, about 2270 Newtons, about 2280 Newtons, about 2290 Newtons, about 2300 Newtons, about 2310 Newtons, about 2320 Newtons, about 2330 Newtons, about 2340 Newtons, about 2350 Newtons, about 2360 Newtons, about 2370 Newtons, about 2380 Newtons, about 2390 Newtons, about 2400 Newtons, and ranges having any combination of endpoints thereof.

In embodiments, the compositions described herein can have a multiaxial impact total energy of at least 12 Joules when measured according to ISO 6603-2 (at 2.2 meters/second), including about 12.0 J, about 12.2 J, about 12.4 J, about 12.6 J, about 12.8 J, about 13.0 J, about 13.2 J, about 13.4 J, about 13.6 J, about 13.8 J, about 14.0 J, about 14.2 J, about 14.4 J, about 14.6 J, about 14.8 J, about 15.0 J, about 15.2 J, about 15.4 J, about 15.6 J, about 15.8 J, about 16.0 J, about 16.2 J, about 16.4 J, about 16.6 J, about 16.8 J, about 17.0 J, about 17.2 J, about 17.4 J, about 17.6 J, about 17.8 J, about 18.0 J, about 18.2 J, about 18.4 J, about 18.6 J, about 18.8 J, about 19.0 J, about 19.2 J, about 19.4 J, about 19.6 J, about 19.8 J, about 20 J, and ranges having any combination of endpoints thereof.

In embodiments, the compositions described herein can have a haze value of less than about 80% when extruded as a sheet having a thickness of about 47 mils (i.e., about 1.2 mm) and measured according to ASTM D1003, including about 80%, about 78%, about 76%, about 74%, about 72%, about 70%, about 68%, about 66%, about 64%, about 62%, about 60%, about 58%, about 56%, about 54%, about 52%, about 50%, about 48%, about 46%, about 44%, about 42%, about 40%, and ranges having any combination of endpoints thereof.

In embodiments, the compositions described herein can have a haze value of less than 20% when thermoformed into a thin-walled deli cup (e.g., about 2 inch height, about 3 inch diameter at the bottom, and about 3.5 inch diameter at the top) having a wall thickness of about 10 mils (i.e., about 0.25 mm) and measured according to ASTM D1003, including about 20%, about 19.8%, about 19.6%, about 19.4%, about 19.2%, about 19%, about 18.8%, about 18.6%, about 18.4%, about 18.2%, about 18%, about 17.8%, about 17.6%, about 17.4%, about 17.2%, about 17%, about 16.8%, about 16.6%, about 16.4%, about 16.2%, about 16%, about 15.8%, about 15.6%, about 15.4%, about 15.2%, about 15%, about 14.8%, about 14.6%, about 14.4%, about 14.2%, about 14%, about 13.8%, about 13.6%, about 13.4%, about 13.2%, about 13%, about 12.8%, about 12.6%, about 12.4%, about 12.2%, about 12%, about 11.8%, about 11.6%, about 11.4%, about 11.2%, about 11%, about 10.8%, about 10.6%, about 10.4%, about 10.2%, about 10%, about 9.8%, about 9.6%, about 9.4%, about 9.2%, about 9%, about 8.8%, about 8.6%, about 8.4%, about 8.2%, about 8%, about 7.8%, about 7.6%, about 7.4%, about 7.2%, about 7%, about 6.8%, about 6.6%, about 6.4%, about 6.2%, about 6%, about 5.8%, about 5.6%, about 5.4%, about 5.2%, about 5%, and ranges having any combination of endpoints thereof.

In embodiments, the compositions described herein can have a rim diameter shrinkage, measured as a function of the difference between the rim diameter of a fully conditioned cup and the mold dimensions, of less than about 3.0%, including about 3.00%, about 2.95%, about 2.90%, about 2.85%, about 2.80%, about 2.75%, about 2.70%, about 2.65%, about 2.60%, about 2.55%, about 2.50%, about 2.45%, about 2.40%, about 2.35%, about 2.30%, about 2.25%, about 2.20%, about 2.15%, about 2.10%, about 2.05%, about 2.00%, about 1.95%, about 1.90%, about 1.85%, about 1.80%, about 1.75%, about 1.70%, about 1.65%, about 1.60%, about 1.55%, about 1.50%, about 1.45%, about 1.40%, about 1.35%, about 1.30%, about 1.25%, about 1.20%, about 1.15%, about 1.10%, about 1.05%, about 1.00%, and ranges having any combination of endpoints thereof.

In embodiments, the compositions described herein can have a tensile modulus of at least about 2.35 GPa when measured according to ASTM D638, including about 2.35 GPa, about 2.36 GPa, about 2.37 GPa, about 2.38 GPa, about 2.39 GPa, about 2.4 GPa, about 2.41 GPa, about 2.42 GPa, about 2.43 GPa, about 2.44 GPa, about 2.45 GPa, about 2.46 GPa, about 2.47 GPa, about 2.48 GPa, about 2.49 GPa, about 2.5 GPa, about 2.51 GPa, about 2.52 GPa, about 2.53 GPa, about 2.54 GPa, about 2.55 GPa, about 2.56 GPa, about 2.57 GPa, about 2.58 GPa, about 2.59 GPa, about 2.6 GPa, about 2.61 GPa, about 2.62 GPa, about 2.63 GPa, about 2.64 GPa, about 2.65 GPa, about 2.66 GPa, about 2.67 GPa, about 2.68 GPa, about 2.69 GPa, about 2.7 GPa, and ranges having any combination of endpoints thereof.

In embodiments, the compositions described herein can have a tensile strength of at least about 38 MPa when measured according to ASTM D638, including about 38 MPa, about 38.1 MPa, about 38.2 MPa, about 38.3 MPa, about 38.4 MPa, about 38.5 MPa, about 38.6 MPa, about 38.7 MPa, about 38.8 MPa, about 38.9 MPa, about 39 MPa, about 39.1 MPa, about 39.2 MPa, about 39.3 MPa, about 39.4 MPa, about 39.5 MPa, about 39.6 MPa, about 39.7 MPa, about 39.8 MPa, about 39.9 MPa, about 40 MPa, about 40.1 MPa, about 40.2 MPa, about 40.3 MPa, about 40.4 MPa, about 40.5 MPa, about 40.6 MPa, about 40.7 MPa, about 40.8 MPa, about 40.9 MPa, about 41 MPa, about 41.1 MPa, about 41.2 MPa, about 41.3 MPa, about 41.4 MPa, about 41.5 MPa, about 41.6 MPa, about 41.7 MPa, about 41.8 MPa, about 41.9 MPa, about 42 MPa, about 42.1 MPa, about 42.2 MPa, about 42.3 MPa, about 42.4 MPa, about 42.5 MPa, about 42.6 MPa, about 42.7 MPa, about 42.8 MPa, about 42.9 MPa, about 43 MPa, about 43.1 MPa, about 43.2 MPa, about 43.3 MPa, about 43.4 MPa, about 43.5 MPa, about 43.6 MPa, about 43.7 MPa, about 43.8 MPa, about 43.9 MPa, about 44 MPa, about 44.1 MPa, about 44.2 MPa, about 44.3 MPa, about 44.4 MPa, about 44.5 MPa, about 44.6 MPa, about 44.7 MPa, about 44.8 MPa, about 44.9 MPa, about 45 MPa, and ranges having any combination of endpoints thereof.

In embodiments, the compositions described herein can have a maximum elongation of less than about 65% when measured according to ASTM D638, including about 60%, about 55%, about 54%, about 53%, about 52%, about 51%, about 50%, about 49%, about 48%, about 47%, about 46%, about 45%, about 44%, about 43%, about 42%, about 41%, about 40%, about 39%, about 38%, about 37%, about 36%, about 35%, about 34%, about 33%, about 32%, about 31%, about 30%, about 29%, about 28%, about 27%, about 26%, about 25%, about 24%, about 23%, about 22%, about 21%, about 20%, and ranges having any combination of endpoints thereof.

In embodiments, the compositions described herein can achieve a combination of the properties described above, including the stiffness (e.g., flexural modulus), impact (e.g., peak force and total energy), physical (e.g., rim diameter shrinkage), and optical (e.g., haze) properties. In embodiments, the compositions described herein can achieve a combination of the properties described above, including the stiffness (e.g., tensile modulus, tensile strength, flexural modulus, flexural strength), impact (e.g., peak force and total energy), physical (e.g., rim diameter shrinkage), and optical (e.g., haze) properties.

Also disclosed herein are food packaging articles formed from the compositions described above. In particular, the food packaging articles of the present disclosure are suitable for storing and contacting food (i.e., having at least one surface suitable for contacting a food product). In some embodiments, the food packaging article can be, for example and without limitation, a cup, a tube, a packet, and/or the like. In embodiments, the food packaging article may be single-use. In particular embodiments, the food product can comprise a solid, a liquid, and/or a semi-liquid foodstuff. For example, in some embodiments, the food product can include, but is not limited to, yogurt, a condiment, a dip, a sauce, a dressing, and/or the like.

Figure 1A:
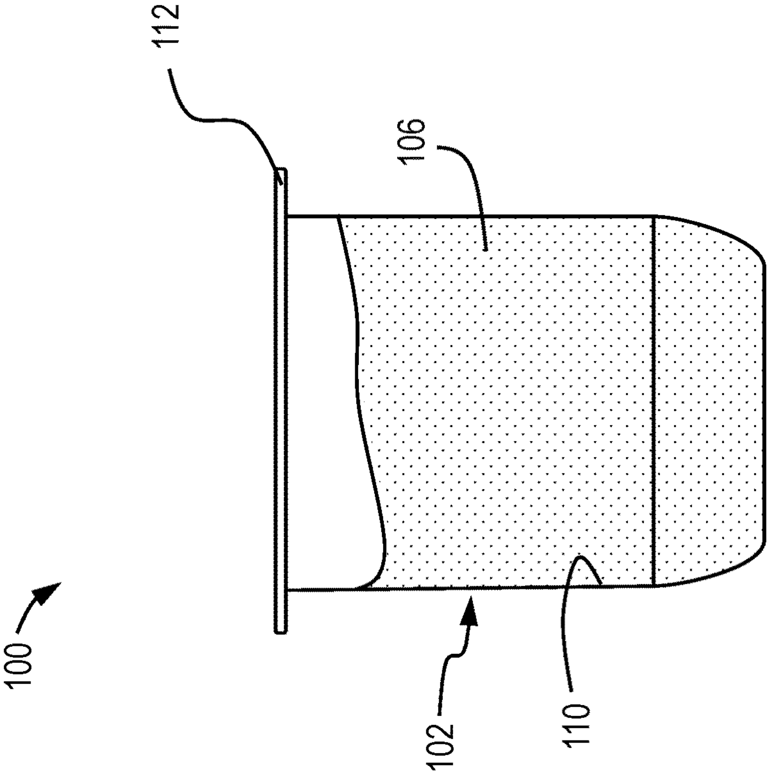
FIG. 1A is a diagram illustrating a food packaging article formed from a food contact material composition according to aspects of the present disclosure.

For example, with reference to FIGS. 1A and 1B, an exemplary food packaging article 100 and a perspective of multiple food packaging articles 100 are illustrated according to aspects of the present disclosure. In embodiments, the food packaging article 100 comprises a vessel portion 102 having an interior volume 104 configured to hold a food product 106. In some embodiments, the vessel portion 102 may comprise sidewalls 108 formed from an FCM composition of the present disclosure. The sidewalls 108 can include a thin wall having a cross-sectional thickness of about 5 mm or less, including about 4 mm, about 3 mm, about 2 mm, and ranges having any combination of endpoints thereof. In further embodiments, the sidewalls 108 may be transparent. In further embodiments, the sidewalls 108 can have at least one surface 110 suitable for contact with the food product 106.

In embodiments, food packaging article 100 further comprises a snappable portion 112 that enables separation of one food packaging article 100 from an adjacent food packaging article 100. For example, in the example of FIG. 1B, snapping the snappable portion 112 may break-off a first food packaging article 100 from a set of multiple food packaging article 100. In embodiments, the snappable portion 112 may also be formed from an FCM composition of the present disclosure, can be transparent, and have a cross-sectional thickness of about 5 mm to less, including about 4 mm, about 3 mm, about 2 mm, and ranges having any combination of endpoints thereof.

In particular embodiments, the food packaging articles (e.g., article 100) formed from the compositions described above meet applicable regulatory standards. For example, the polypropylenes used to manufacture the food packaging articles of the present disclosure can comply with U.S. Food and Drug Administration (FDA) regulations under 21 C.F.R. § 177.1520. In further embodiments, the additives in the food packaging articles of the present disclosure can comply with FDA regulations 21 C.F.R. § 178.2010. In still further embodiments, the food packaging articles of the present disclosure can be safely used a component of packaging that contacts all food types described in Table 1 and Conditions of Use B-H described in Table 2 of 21 C.F.R. § 176.170(c).

Figure 2:
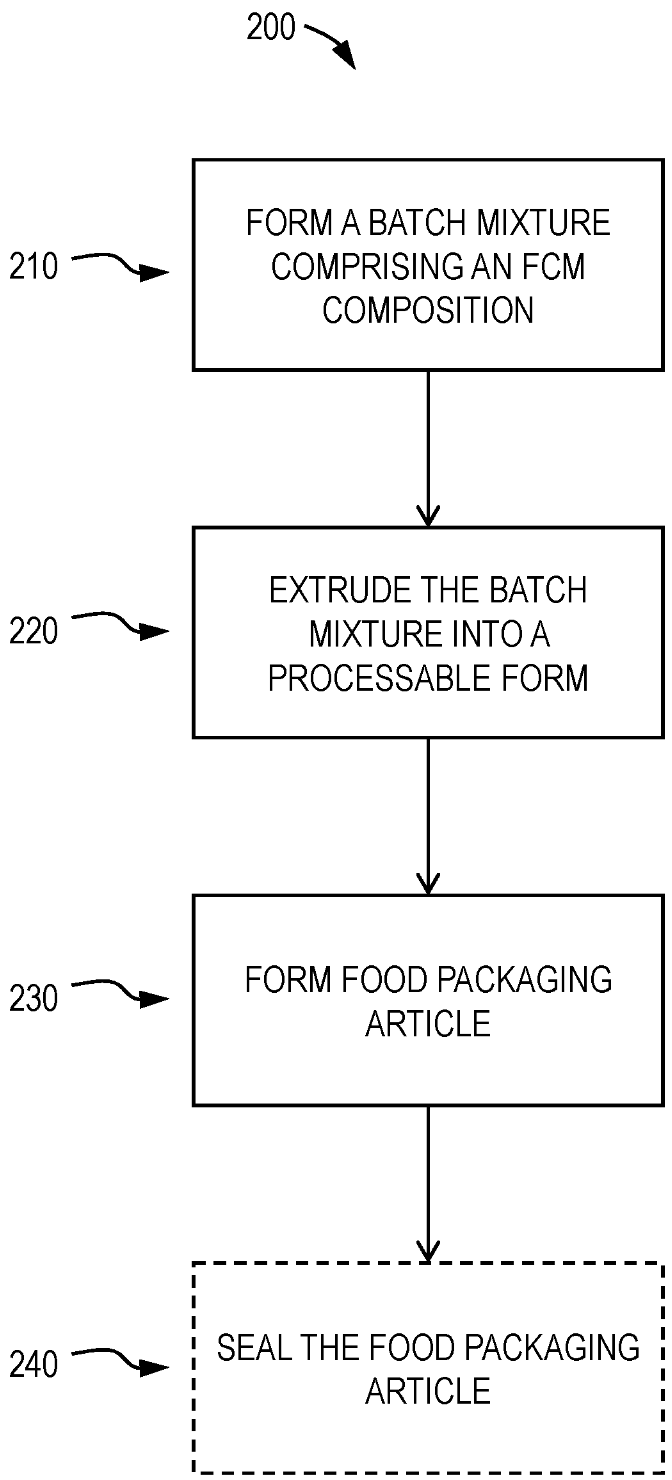
FIG. 2 is a flowchart illustrating a method of manufacturing a food packaging article according to aspects of the present disclosure.

Also provided herein are methods of manufacturing a food packaging article suitable for contacting a food product. For example, with reference to FIG. 2, a method 200 of manufacturing a food packaging article (e.g., article 100) suitable for contacting a food product (e.g., foodstuff 106). In embodiments, the method 200 comprises: in a step 210, forming a batch mixture comprising an FCM composition; in a step 220, extruding the batch mixture into a processable form; in a step 230, forming a food packaging article using the processable form of the batch mixture; and, optionally, in a step 240, sealing the food packaging article.

In embodiments, the step 110 includes forming a batch mixture comprising a food contact material (FCM) composition in accordance with various aspects of the present disclosure. In particular embodiments, the composition comprises from about 60 wt % to about 99 wt % of a first polypropylene, from about 1 wt % to about 40 wt % of a second polypropylene that is different from the first polypropylene, and from about 0.2 wt % to about 3 wt % of a nucleating agent. In embodiments, each of the components may be provided separately combined, blended, or otherwise mixed together to form the composition used in the batch mixture. In some embodiments, a mixer or other low shear process can be used to form the batch mixture.

In embodiments, the step 220 includes extruding the batch mixture using an extrusion machine and forming the batch mixture into a processable form. For example, in some embodiments, the batch mixture may be extruded, quenched in a water bath, and pelletized. In other embodiments, the batch mixture may be extruded into sheets or thin sheets (e.g., having a thickness of less than 5 mm as described above).

In embodiments, the step 230 includes forming a fillable food packaging article using the processable form of the batch mixture. In some embodiments, the fillable food packaging article may be formed by molding, injection molding, overmolding, extrusion, rotational molding, and/or blow molding the processable form of the batch mixture into the desired shape. In particular embodiments, the fillable food packaging article may be formed by thermoforming the processable form of the batch mixture. In embodiments, the food packaging article may be thermoformed at a temperature less than about 165° C., including about 160° C., about 155° C., about 150° C., about 145° C., and/or ranges having any combination of endpoints thereof.

Although one example of a food packaging article is illustrated in FIGS. 1A and 1B, it should be appreciated that the fillable food packaging article can take one or more desired shapes, including but not limited to, a cup, a tube, a packet, and/or the like. In particular embodiments, the fillable food packaging article may comprise an opening or unsealed portion that enables the fillable food packaging article to be filled with a food product (e.g., a solid, a liquid, and/or a semi-liquid foodstuff, etc.).

In embodiments, the method 200 optionally includes the step 240, wherein the fillable food packaging article is sealed to form a final food packaging article (e.g., article 100). In particular embodiments, the fillable food packaging article may be filled with a food product prior to sealing the fillable article. In some embodiments, the fillable article or a portion thereof can be sealed using one or more sealing techniques (e.g., heat sealing, conduction sealing, induction sealing, adhesive sealing, ultrasonic bonding, welding, laser sealing, and combinations thereof).

As described herein, this disclosure presents multiple aspects that are further illustrated by the following non-limiting examples.

EXAMPLES

All measurements were taken at room temperature (~23° C.) unless noted herein or otherwise specified in the corresponding standard protocol. Stiffness of the compositions was evaluated by measuring flexural modulus (MD and TD) according to ASTM D790 at 1% secant. Multiaxial impact properties were evaluated by measuring peak force and total energy according to ISO-6603-2 at 2.2 meters/second. Clarity was evaluated by measuring haze of the composition in various forming according to ASTM D1003. Melt flow rate was measured according to ASTM D1238. And shrinkage was evaluated by measuring rim diameter of the conditioned cups versus the diameter of the thermoforming mold.

Example 1

In an example, certain commercially-available polypropylene compositions were evaluated with and without 1 wt % of a nucleating agent. The nucleating agent used was UltraBalance™ Solution Natural 10359 by Milliken® and the polypropylenes were provided as illustrated in Table 1A below. The results are shown in Table 1B.

TABLE 1A

| Ref.# | Polymer | Manufacturer | Melt Flow (g/10 min.) | Description |
|---|---|---|---|---|
| PP-1 | PP4052 | ExxonMobil | 2 | Homopolymer, non-nucleated |

TABLE 1A-continued

| Ref.# | Polymer | Manufacturer | Melt Flow (g/10 min.) | Description |
|---|---|---|---|---|
| PP-2 | PP6282NE | ExxonMobil | 1.8 | HMS PP, nucleated |
| PP-3 | PP6272 | ExxonMobil | 2.8 | Homopolymer, nucleated |
| PP-4 | PP 561P | SABIC | 2.5 | HMS PP, non-nucleated |
| PP-5 | 6021WN | Braskem America, Inc. | 2 | Random copolymer, nucleated |
| PP-6 | Total PP 3927 | TotalEnergies | 60 | Homopolymer, nucleated |
| PP-7 | Total PP 3270 | TotalEnergies | 2 | Homopolymer, non-nucleated |
| PP-8 | CH550LN | Philips 66 | 55 | Homopolymer, nucleated |
| PP-9 | FP650WV | Braskem. America, Inc | 65 | Homopolymer, nucleated |

TABLE 1B

| | Flex Modulus (MPa) | |
|---|---|---|
| Ref.# | without NA-1 | with 1 wt % NA-1 |
| PP-1 | 1740 | 1970 |
| PP-2 | 2081 | 2114 |
| PP-3 | 1738 | 1787 |
| PP-4 | 1970 | 1859 |
| PP-5 | 1752 | 1786 |

Figure 3:
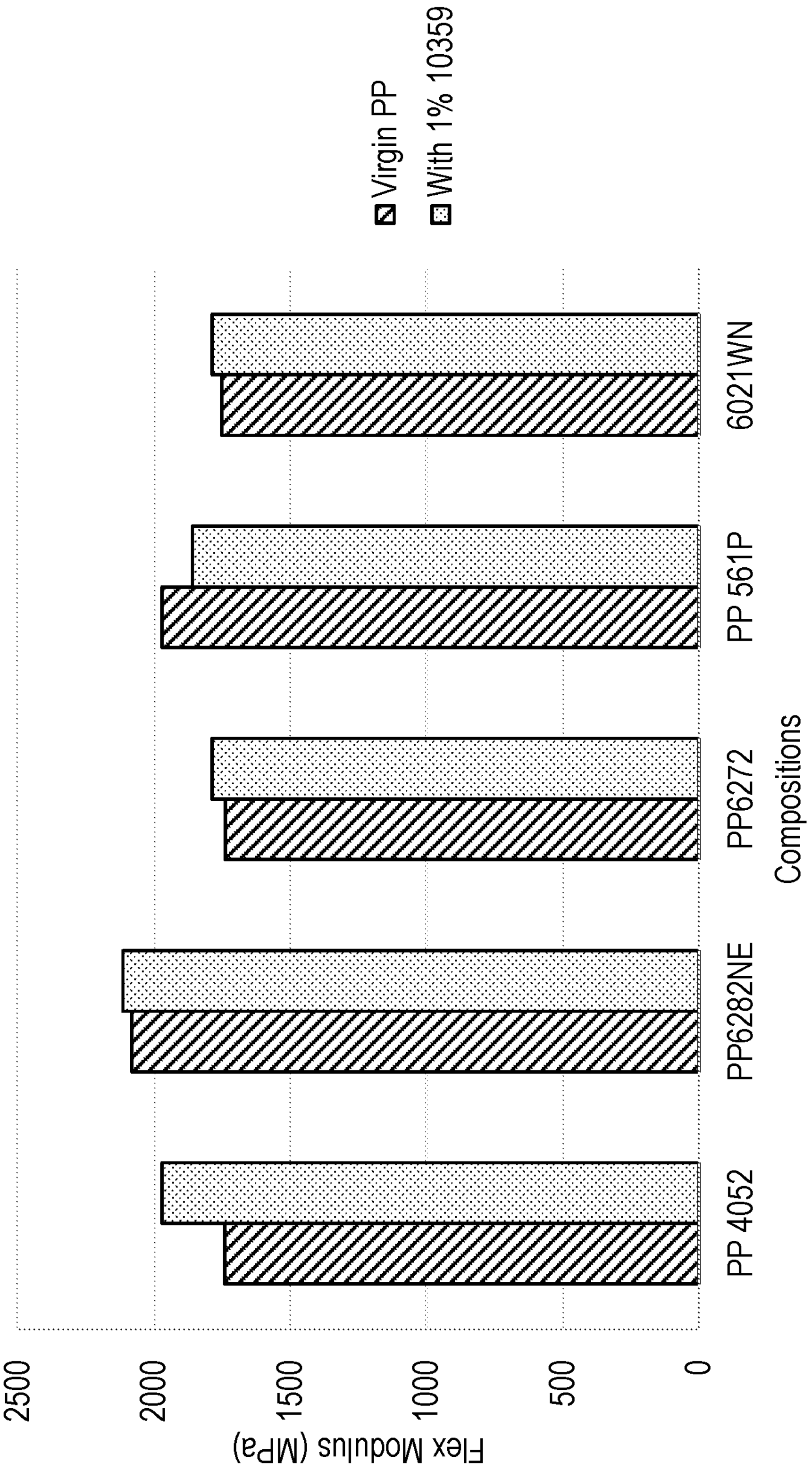
FIG. 3 is a plot of the flexural modulus of different polypropylene-containing compositions illustrated according to aspects of the present disclosure.

The results shown in Table 1B are also illustrated graphically in FIG. 3. These results suggest that adding a nucleating agent to a polypropylene-containing composition that does not already include a nucleating agent (e.g., adding a nucleating agent to a non-nucleated composition) can increase the composition's stiffness significantly, as shown with respect PP-1 whereby adding 1 wt % NA-1 increased the composition's stiffness by about 13.2%. Without being limited by theory, it is possible that similar results were not seen for PP-4 because PP-4 is a special polypropylene grade with enhanced high melt strength and may contain more residue and long chains that already serve as nucleating points.

Example 2

In an example, PP-1 was further loaded with additional nucleating agent and the composition's stiffness was re-evaluated, as shown in Table 2.

TABLE 2

| | Flex Modulus (MPa) | | |
|---|---|---|---|
| Ref.# | without NA-1 | with 1 wt % NA-1 | with 2 wt % NA-1 |
| PP-1 | 1740 | 1970 | 2006 |

Figure 4:
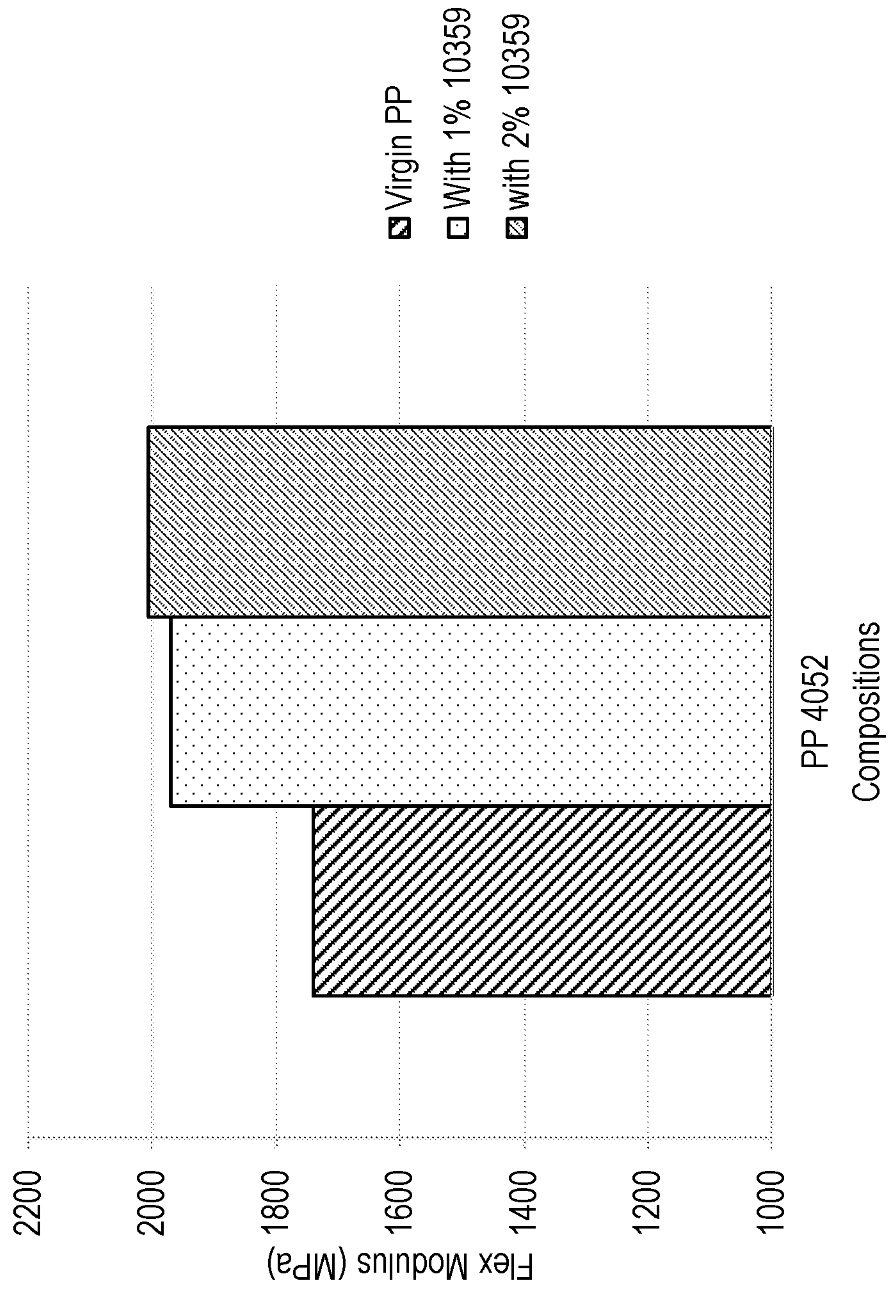
FIG. 4 is a plot of the flexural modulus of a polypropylene composition containing different amounts of a nucleating agent illustrated according to aspects of the present disclosure.

The results shown in Table 2 are also illustrated graphically in FIG. 4. As shown herein, the addition of 1 wt % NA-1 to PP-1 increases its stiffness by about 13.2%, adding an additional 1 wt % of NA-1 only increasing the stiffness of the resulting composition by about 1.8%. In other words, adding 1 wt % of a nucleating agent increased the composition's stiffness by about 13.2% while adding double that amount (i.e., 2 wt % of a nucleating agent) increased the composition's stiffness by 15.3% when compared with the base composition. These results indicate that the use of a nucleating agent can only improve the stiffness of the relevant compositions by a certain extent.

Example 3

In an example, a first and a second polypropylene were blended and evaluated for changes in stiffness. In particular, different amounts of PP-6 were separately blended with PP-1, PP-4, and PP-5 and tested as shown below in Table 3. PP-6 has a higher melt flow rate of 60 g/10 min. and already contains a nucleating agent (i.e., is nucleated).

TABLE 3

| | Flex Modulus (MPa) | | |
|---|---|---|---|
| Ref.# | without PP-6 | with 10 wt % PP-6 | with 20 wt % PP-6 |
| PP-1 | 1740 | 2247 | |
| PP-4 | 1970 | 2089 | 2098 |
| PP-5 | 1752 | 1904 | |

Figure 5:
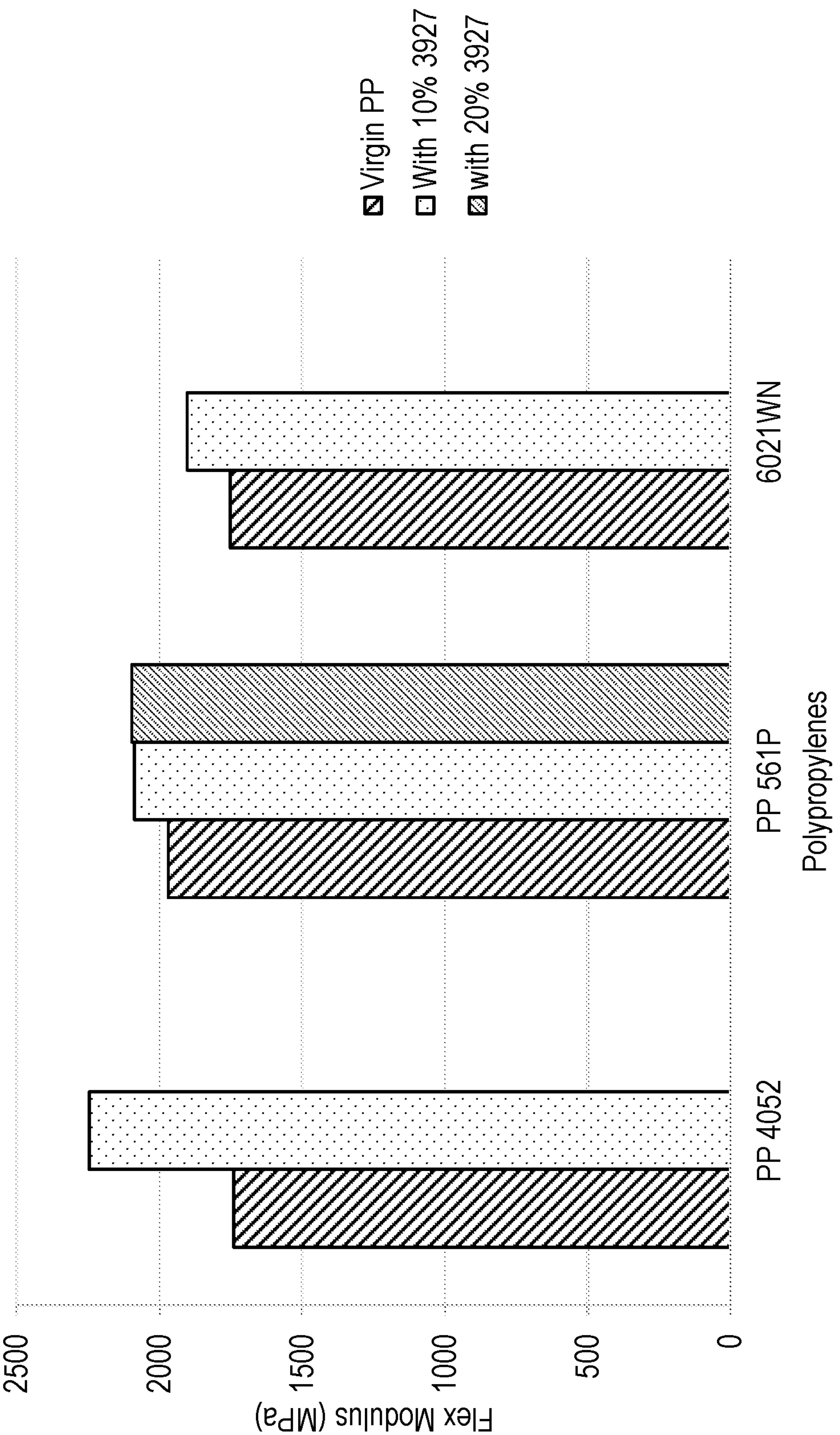
FIG. 5 is a plot of the flexural modulus of different compositions containing a first polypropylene and a second polypropylene illustrated according to aspects of the present disclosure.

The results shown in Table 3 are also illustrated graphically in FIG. 5. As shown herein, the addition PP-6 can improve the stiffness of compositions, including nucleated and non-nucleated compositions such as PP-4 and PP-5, which saw increases of between about 6% and about 10%. However, by blending 10 wt % of PP-6 with PP-1, it was surprisingly found that the flexural modulus increased from about 1740 MPa to about 2247 MPa, which is an increase of approximately 30%.

Example 4

In an example, additional formulations with polypropylene blends and different loading of nucleating agents (listed in Table 4 in wt %) were extruded as sheets and later thermoformed into cups. According to this example, a second nucleating agent, UltraView Solution Natural 10034 from Milliken® (NA-2) was tested in addition to NA-1. The extruded sheets and thermoformed cups were evaluated based on certain mechanical and optical properties, as shown in Table 4 below.

TABLE 4

| Component | | Sheet 1 | Sheet 2 | Sheet 3 |
|---|---|---|---|---|
| PP-1 | | 90 | 89.3 | 89.3 |
| PP-6 | | 10 | 8.9 | 8.9 |
| NA-1 | | | 1.8 | |
| NA-2 | | | | 1.8 |
| Properties | Unit | | | |
| Stiffness | | | | |
| Flexural Modulus (MD) | MPa | 2157 | 2215 | 2218 |
| Flexural Modulus (TD) | MPa | 2143 | 2175 | 2231 |
| Multiaxial Impact (at 23° C.) | | | | |
| Peak force | Newtons | 2066 | 1622 | 2151 |
| Total energy | Joules | 12.7 | 6.2 | 16.8 |
| Physical | | | | |
| Shrinkage (rim diameter) | % | 2.09 | 2.16 | 2.04 |
| Optical | | | | |
| Haze (sheet) | % | 76.2 | 100 | 61.4 |
| Haze (cup) | % | 17.5 | 58.2 | 11.2 |

Figure 6:
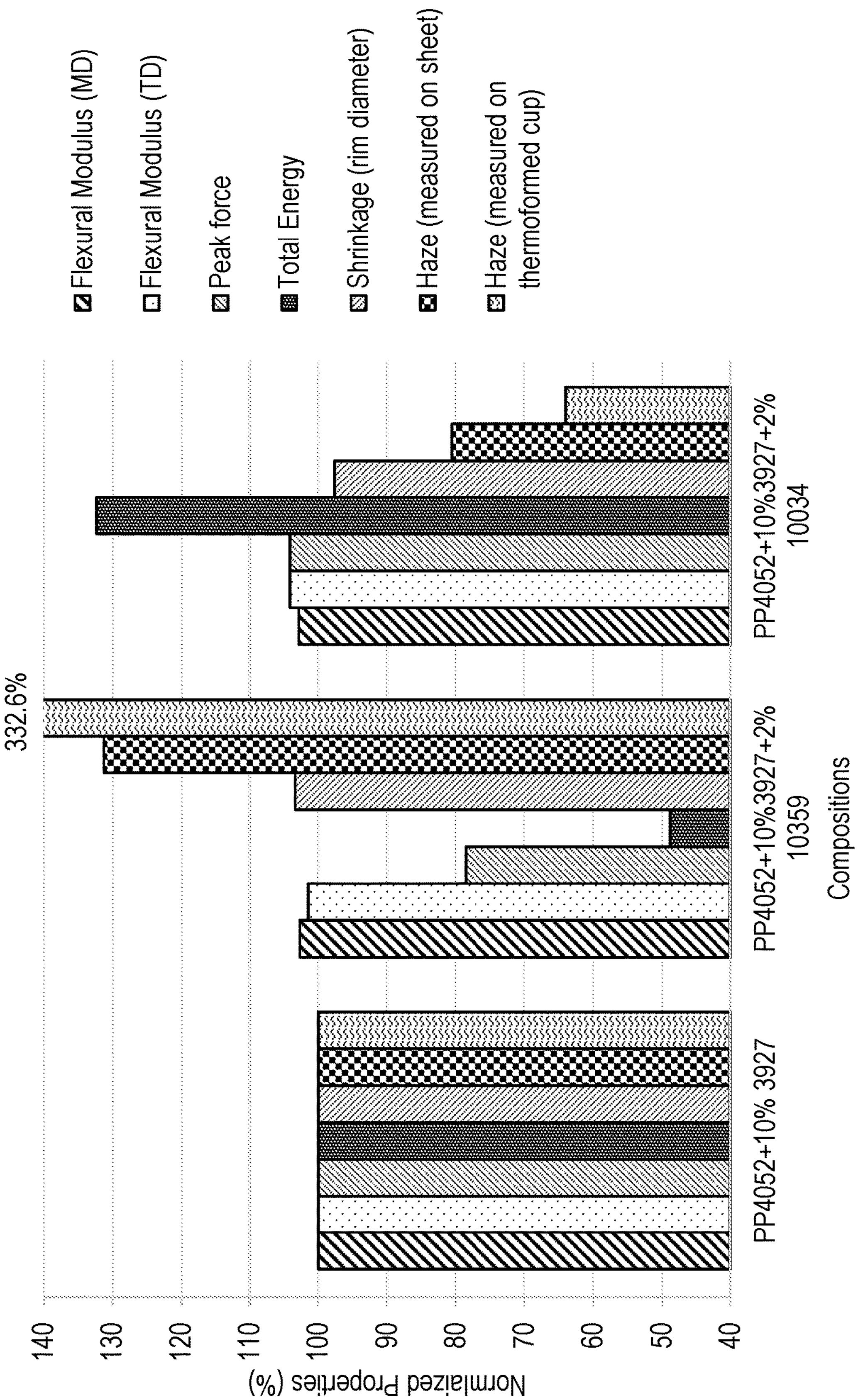
FIG. 6 is a plot of different compositions containing a first and a second polypropylene and different a nucleating agents illustrated according to aspects of the present disclosure.

The results shown in Table 4 are also illustrated graphically in FIG. 6. As shown, adding about 1.8 wt % of NA-2 improved the stiffness of the extruded sheet samples. Further, NA-2 improved the impact strength of the sheet and reduced the haze value significantly in addition to improving the shrinkage.

Example 5

In another example, additional polypropylene blends (listed in Table 5 in wt %) were created and evaluated according to ASTM D638. In particular, five polypropylene formulations were compounded via a twin screw extruder and then injection molded into Type I dogbones, and evaluated for tensile modulus, tensile strength, and max elongation (at a speed of 50 mm/min and 5 repetitions per formulation). More specifically, two comparative examples containing about 100 wt % of PP-1 and about 100 wt % of PP-7 were compared with the examples as shown in Table 5 below:

TABLE 5

| | | | Inventive Examples | | |
|---|---|---|---|---|---|
| Component | C1 | C2 | IB-1 | IB-2 | IB-3 |
| PP-1 | 100 | | 68 | | |
| PP-7 | | 100 | | 68 | 89 |
| PP-6 | | | 30 | 30 | 10 |
| NA-2 | | | 2 | 2 | 1 |
| Properties Mechanical Properties | Unit | | | | |
| Tensile Modulus | GPa | 2.19 | 2.03 | 2.37 | 2.37 | 2.35 |
| Tensile Strength | MPa | 37.4 | 39.7 | 38.3 | 41.5 | 41.8 |
| Max Elongation | % | 55 | 119 | 28 | 50 | 65 |

From Table 5, it can be seen that similar trends in stiffness and max elongation are exhibited for compositions containing both PP-1 and PP-7. For example, adding an amount of PP-6 and an amount of the nucleating agent NA-2 increased tensile modulus and tensile strength while significant decreasing max elongation.

Example 6

In another example, additional polypropylene blends (listed in Table 6 in wt %) were created and evaluated according to ASTM D638. In particular, eight polypropylene formulations were compounded via a twin screw extruder and then injection molded into Type I dogbones, and evaluated for tensile modulus, tensile strength, and max elongation (at a speed of 50 mm/min and 5 repetitions per formulation). More specifically, a comparative example containing about 100 wt % of PP-1 was compared with the examples containing a second polypropylene (e.g., PP-6, PP-8, or PP-9) and a nucleating agent NA-2 or NA-3 (Ultraclear 120B by Milliken®) as shown in Table 6 below:

TABLE 6

| | | | | Inventive Examples | | | | |
|---|---|---|---|---|---|---|---|---|
| Component | | C1 | IB-1 | IB-4 | IB-5 | IB-6 | IB-7 | IB-8 | IB-9 |
| PP-1 | | 100 | 68 | 89 | 68 | 68 | 89 | 68 | 89 |
| PP-6 | | | 30 | 10 | | | | | |
| PP-8 | | | | | 30 | 30 | 10 | | |
| PP-9 | | | | | | | | 30 | 10 |
| NA-2 | | | 2 | 1 | | 2 | 1 | 2 | 1 |
| NA-3 | | | | | 2 | | | | |
| Properties Mechanical Properties | Unit | | | | | | | | |
| Tensile Modulus | GPa | 2.19 | 2.37 | 2.4 | 2.33 | 2.42 | 2.45 | 2.53 | 2.62 |
| Tensile Strength | MPa | 37.4 | 38.3 | 38.6 | 41.6 | 43.5 | 41.9 | 41.8 | 41.8 |
| Max Elongation | % | 55 | 28 | 23 | 37 | 19 | 29 | 48 | 56 |

From Table 6, it can be seen that similar trends in stiffness (as measured by tensile modulus and tensile strength) and max elongation are exhibited for polypropylene compositions containing either PP-6, PP-8, or PP-9. For example, comparative example 1 (C1) containing about 100 wt % has a tensile modulus of about 2.19 GPa, a tensile strength of about 37.4 MPa, and a max elongation of about 55%. In comparison, inventive blends IB-1, IB-6, and IB-8 containing about 30 wt % of PP-6, PP-8, and PP-9, respectively, exhibit an increase in tensile modulus by from about 0.18 GPa to about 0.34 GPa, an increase in tensile strength by from about 0.9 MPa to about 6.1 MPa, and a decrease in max elongation by from about 7% to about 36%. Further, inventive blends IB-4, IB-7, and IB-9 containing about 10 wt % of PP-6, PP-8, and PP-9, respectively, exhibit an increase in tensile modulus by from about 0.21 GPa to about 0.43 GPa, an increase in tensile strength by from about 1.2 MPa to about 4.5 MPa, and a decrease in max elongation by from about 26% to about 32% (except for IB-9, which exhibited a max elongation of about 56%, roughly the same as CB-1).

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. Unless otherwise defined, all technical and scientific terms used herein have the same meaning as commonly understood by one of ordinary skill in the art. The materials, methods, and examples disclosed herein are illustrative only and not intended to be limiting.

The indefinite articles “a” and “an,” as used herein in the specification and in the claims, unless clearly indicated to the contrary, should be understood to mean “at least one.”

The phrase “and/or,” as used herein in the specification and in the claims, should be understood to mean “either or both” of the elements so conjoined, i.e., elements that are conjunctively present in some cases and disjunctively present in other cases. Multiple elements listed with “and/or” should be construed in the same fashion, i.e., “one or more” of the elements so conjoined. Other elements may optionally be present other than the elements specifically identified by the “and/or” clause, whether related or unrelated to those elements specifically identified.

As used herein in the specification and in the claims, “or” should be understood to have the same meaning as “and/or” as defined above. For example, when separating items in a list, “or” or “and/or” shall be interpreted as being inclusive, i.e., the inclusion of at least one, but also including more than one, of a number or list of elements, and, optionally, additional unlisted items. Only terms clearly indicated to the contrary, such as “only one of” or “exactly one of,” or, when used in the claims, “consisting of,” will refer to the inclusion of exactly one element of a number or list of elements. In general, the term “or” as used herein shall only be interpreted as indicating exclusive alternatives (i.e. “one or the other but not both”) when preceded by terms of exclusivity, such as “either,” “one of,” “only one of,” or “exactly one of.”

As used herein in the specification and in the claims, the phrase “at least one,” in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase “at least one” refers, whether related or unrelated to those elements specifically identified.

The terms “first”, “second”, “third”, and the like, as used herein, do not denote any order, quantity, or importance, but rather are used to distinguish one element from another.

Compounds are described using standard nomenclature. For example, any position not substituted by any indicated group is understood to have its valency filled by a bond as indicated, or a hydrogen atom. A dash (“-”) that is not between two letters or symbols is used to indicate a point of attachment for a substituent. For example, the aldehyde group —CHO is attached through the carbon of the carbonyl group.

The present disclosure refers to “polymers,” “oligomers”, and “compounds”. A polymer is a large molecule composed of multiple repeating units chained together, the repeating units being derived from a monomer. One characteristic of a polymer is that different molecules of a polymer will have different lengths, and a polymer is described as having a molecular weight that is based on the average value of the chains (e.g. weight average or number average molecular weight). The art also distinguishes between an “oligomer” and a “polymer”, with an oligomer having only a few repeating units, while a polymer has many repeating units. For purposes of this disclosure, the term “oligomer” refers to such molecules having a weight average molecular weight of less than 15,000, and the term “polymer” refers to molecules having a weight average molecular weight of 15,000 of more, as measured by GPC using polycarbonate molecular weight standards. In contrast, for a compound, all molecules will have the same molecular weight. Compared to a polymer, a compound is a small molecule.

The term “homopolymer” as used herein refers to a polymer derived from only one structural unit or monomeric species.

The term “copolymer” refers to a polymer derived from two or more structural unit or monomeric species, as opposed to a homopolymer, which is derived from only one structural unit or monomer.

The term “snappability” as used herein refers to the ability of a solid material to break-off into discrete components or parts upon application of a force within a generally known range. For example, a multipack of connected yogurt cups formed from a snappable material will readily allow a consumer to break-off an individual cup from the multipack at a desired snappable portion or joint.

The term “haze” refers to the percentage of transmitted light, which in passing through a specimen deviates from the incident beam by forward scattering. Percent (%) haze may be measured according to ASTM D 1003.

The term “Melt Volume Rate” (MVR) or “Melt Flow Rate (MFR)” refers to the flow rate of a polymer in a melt phase as determined using the method of ASTM D1238. The MVR of a molten polymer is measured by determining the amount of polymer that flows through a capillary of a specific temperature over a specified time using standard weights at a fixed temperature. MVR is expressed in cubic centimeter per 10 minutes, and MFR is expressed in grams per 10 minutes. The higher the MVR or MFR value of a polymer at a specific temperature, the greater the flow of that polymer at that specific temperature.

It should also be understood that, unless clearly indicated to the contrary, in any methods claimed herein that include more than one step or act, the order of the steps or acts of the method is not necessarily limited to the order in which the steps or acts of the method are recited.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

As used herein, approximating language may be applied to modify any quantitative representation that may vary without resulting in a change in the basic function to which it is related. Accordingly, a value modified by a term or terms, such as “about” and “substantially,” may not be limited to the precise value specified, in some cases. In at least some instances, the approximating language may correspond to the precision of an instrument for measuring the value. The modifier “about” should also be considered as disclosing the range defined by the absolute values of the two endpoints. For example, the expression “from about 2 to about 4” also discloses the range “from 2 to 4.” The term “about” may refer to plus or minus 10% of the indicated number. For example, “about 10%” may indicate a range of 9% to 11%, and “about 1” may mean from 0.9-1.1. Other meanings of “about” may be apparent from the context, such as rounding off, so, for example “about 1” may also mean from 0.5 to 1.4.

Additionally, for the recitations of numeric amounts and ranges herein, terms such as “less than about X” and “at least about X” should be interpreted as also explicitly disclosing “about X”. For example, “less than about 3 g/10 min.” expressly contemplates “about 3 g/10 min.”, and “at least 60 g/10 min.” expressly contemplates “about 60 g/10 min.”

In the claims, as well as in the specification above, all transitional phrases such as “comprising,” “including,” “carrying,” “having,” “containing,” “involving,” “holding,” “composed of,” and the like are to be understood to be open-ended, i.e., to mean including but not limited to. Only the transitional phrases “consisting of” and “consisting essentially of” shall be closed or semi-closed transitional phrases, respectively.

What is claimed is:

1. A method of manufacturing a food packaging article suitable for contacting a food product, the method comprising:

forming a batch mixture comprising a food contact material composition;

extruding the batch mixture into a processable form, wherein extruding the batch mixture into a processable form comprises extruding the batch mixture into a sheet; and forming a fillable food packaging article from the processable form of the batch mixture by thermoforming the extruded sheet into a desired shape at a thermoforming temperature of about 165° C. or less;

wherein the food contact material composition comprises: from about 60 wt % to about 99 wt % of a first polypropylene having a melt flow rate of at least about 35 grams/10 minutes, according to ASTM D1238, from about 1 wt % to about 40 wt % of a second polypropylene having a melt flow rate of less than about 3 grams/10 minutes, according to ASTM D1238, and from about 0.02 wt % to about 5 wt % of a nucleating agent.

2. The method of claim 1, wherein the food contact material composition has a machine direction (MD) flexural modulus of at least about 2100 MPa, measured according to ASTM D790 at 1% secant.

3. The method of claim 1, wherein the food contact material composition has a transverse direction (TD) flexural modulus of at least about 2100 MPa, measured according to ASTM D790 at 1% secant.

4. The method of claim 1, wherein the food contact material composition has a multiaxial impact peak force of at least about 2000 Newtons, measured according to ISO 6603-2 at 2.2 meters/second.

5. The method of claim 1, wherein the food contact material composition has a multiaxial impact total energy of at least about 12 Joules, measured according to ISO 6603-2 at 2.2 meters/second.

6. The method of claim 1, wherein the food contact material composition has a haze value of less than about 80% when extruded as a sheet, measured according to ASTM D1003.

7. The method of claim 1, wherein the food contact material composition has a haze value of less than 20% when thermoformed into a cup, measured according to ASTM D1003.

8. The method of claim 1, wherein the food contact material composition has a rim diameter shrinkage of less than about 3.00% when thermoformed into a cup.

9. The method of claim 1, wherein the food contact material composition has a flexural modulus greater than about 2200 MPa when measured according to ASTM D790 at 1% secant, a multiaxial impact peak force greater than about 2100 Newtons when measured according to ISO 6603-2 at 2.2 meters/second, a multiaxial impact total energy greater than about 15 Joules when measured according to ISO 6603-2 at 2.2 meters/second, a rim diameter shrinkage less than about 2.05%, a haze less than about 75% when extruded as a sheet and measured according to measured according to ASTM D1003, and a haze of less than about 11.2% when thermoformed into a cup and measured according to ASTM D1003.

10. A food packaging article having a surface suitable for contacting a food product, the food packaging article being formed using a method according to claim 1.

11. The method of claim 1, wherein the fillable food packaging article is transparent, or has a thin wall having a cross-sectional thickness of 3 mm or less.

12. The method of claim 1, wherein the food contact material composition comprises from about 0.02 wt % to about 3 wt % of the nucleating agent.

13. The method of claim 1, wherein the food contact material composition comprises greater than 2 wt % and up to about 5 wt % of the nucleating agent.

14. The method of claim 1, wherein the extruded sheet has a thickness of about 5 mm or less.

15. The method of claim 1, wherein the food contact material composition has a maximum elongation of about 65% or less when measured according to ASTM D638.

16. The method of claim 15, wherein the food contact material composition has a maximum elongation of about 30% or less when measured according to ASTM D638.

* * * * *